US008386175B2

(12) United States Patent
Limbaugh et al.

(10) Patent No.: US 8,386,175 B2
(45) Date of Patent: Feb. 26, 2013

(54) UNMANNED AERIAL SYSTEM POSITION REPORTING SYSTEM

(75) Inventors: Douglas V. Limbaugh, Glendale, AZ (US); David H. Barnhard, Lilburn, GA (US); Thomas H. Rychener, Phoenix, AZ (US)

(73) Assignee: Kutta Technologies, Inc., Phoenix, AZ (US)

( * ) Notice: Subject to any disclaimer, the term of this patent is extended or adjusted under 35 U.S.C. 154(b) by 983 days.

(21) Appl. No.: 12/370,407

(22) Filed: Feb. 12, 2009

(65) Prior Publication Data

US 2010/0066604 A1 Mar. 18, 2010

Related U.S. Application Data

(60) Provisional application No. 61/029,094, filed on Feb. 15, 2008.

(51) Int. Cl.

| | |
|---|---|
| ***G01C 21/00*** | (2006.01) |
| ***G01S 1/00*** | (2006.01) |
| ***G01S 5/02*** | (2010.01) |

(52) U.S. Cl. .................. 701/485; 701/2; 701/3; 701/14; 701/408; 701/517; 701/120; 701/484; 340/961; 342/36; 342/463

(58) Field of Classification Search .................. 701/2, 3, 701/14, 408, 468, 485, 517, 120; 340/961; 342/36, 463

See application file for complete search history.

(56) References Cited

U.S. PATENT DOCUMENTS

| | | | |
|---|---|---|---|
| 5,111,400 | A | 5/1992 | Yoder |
| 5,574,648 | A | 11/1996 | Pilley |
| 5,890,079 | A | 3/1999 | Levine |
| 6,147,980 | A | 11/2000 | Yee et al. |
| 6,173,159 | B1 | 1/2001 | Wright et al. |
| 6,338,011 | B1 | 1/2002 | Furst et al. |
| 6,677,888 | B2 | 1/2004 | Roy |
| 6,799,114 | B2 | 9/2004 | Etnyre |
| 6,806,829 | B2 | 10/2004 | Smith |
| 6,857,601 | B2 | 2/2005 | Akahori |

(Continued)

FOREIGN PATENT DOCUMENTS

| | | |
|---|---|---|
| EP | 1884908 | 6/2008 |

OTHER PUBLICATIONS

Hartford, Robin, UAT Puts UAVs on the Radar, www.mitre.org/news/digest/aviation/06 08/av uat.html, Jun. 2008, p. 1-3.

(Continued)

*Primary Examiner* — Thomas Tarcza
*Assistant Examiner* — Adam Tissot
(74) *Attorney, Agent, or Firm* — Shannon W. Bates; Klemchuk Kubasta LLP

(57) ABSTRACT

An unmanned aerial system (UAS) position reporting system. Implementations may include an air traffic control reporting system (ATC-RS) coupled with a ground control station (GCS) of an unmanned aerial system where the ATC-RS includes an automatic dependent surveillance broadcast (ADS-B) and a traffic information services broadcast (TIS-B) transceiver and one or more telecommunications modems. The ATC-RS may be adapted to receive position data of the UAS in an airspace from the GCS and communicate the position of the UAS in the airspace to a civilian air traffic control center (ATC) or to a military command and control (C2) communication center through an ADS-B signal or through a TIS-B signal through the ADS-B and TIS-B transceiver. The ATC-RS may also be adapted to display the position of the UAS in the airspace on one or more display screens coupled with the ATC-RS.

13 Claims, 3 Drawing Sheets

U.S. PATENT DOCUMENTS

| | | | | |
|---|---|---|---|---|
| 6,908,061 | B2 | 6/2005 | Akahori | |
| 7,130,741 | B2 | 10/2006 | Bodin et al. | |
| 7,228,232 | B2 | 6/2007 | Bodin et al. | |
| 7,269,513 | B2 | 9/2007 | Herwitz | |
| 7,782,256 | B2 * | 8/2010 | Smith | 342/453 |
| 2004/0148067 | A1 | 7/2004 | Griffith et al. | |
| 2004/0232285 | A1 | 11/2004 | Akahori | |
| 2005/0200501 | A1 | 9/2005 | Smith | |
| 2006/0253254 | A1 | 11/2006 | Herwitz | |
| 2007/0252760 | A1 * | 11/2007 | Smith et al. | 342/451 |
| 2008/0033604 | A1 | 2/2008 | Margolin | |
| 2008/0055149 | A1 * | 3/2008 | Rees et al. | 342/29 |

OTHER PUBLICATIONS

Strain, Robert, A Lightweight, Low-Cost ADS-B System for UAS Applications, Distribution Unlimited Case 07-0634, 2007, p. 1-9.

Strain, Robert, Lightweight Beacon System for UAS and Other Aviation Applications, Mitre Corporation, 2007, p. 1-9.

PCT International Search Report for related PCT/US2009/034088, dated Dec. 14, 2009, 3 pages.

PCT International Preliminary Report on Patentability and Written Opinion of the International Search Authority for related PCT/US2009/034088, dated Aug. 17, 2010, 5 pages.

* cited by examiner

UNMANNED AERIAL SYSTEM POSITION REPORTING SYSTEM

CROSS REFERENCE TO RELATED APPLICATIONS

This document claims the benefit of the filing date of U.S. Provisional Patent Application 61/029,094, entitled "Unmanned Aerial System Position Reporting Systems and Related Methods" to Limbaugh, et al., which was filed on Feb. 15, 2008, the disclosure of which is hereby incorporated entirely herein by reference.

STATEMENT REGARDING FEDERALLY SPONSORED RESEARCH OR DEVELOPMENT

This invention was made with Government support under Contract FA8750-07-C-0096 awarded by the Air Force. The Government has certain rights in this invention.

BACKGROUND

1. Technical Field

Aspects of this document relate generally to control and position reporting systems for unmanned systems, such as aircraft and vehicles.

2. Background Art

Unmanned systems, particularly aircraft and ground vehicles, perform a wide variety of tasks, including mapping, reconnaissance, range finding, target location, combat, ordinance destruction, and sample collection. The use of ground or water-based unmanned vehicles conventionally involves a remote operator guiding the vehicle while manned vehicles detect the presence of the unmanned vehicle using position tracking systems and methods (visual, radar, sonar). Because of the speed and relatively small size of unmanned aerial systems (UASs) however, the use of visual and/or radar techniques to detect the presence of the UAS may make it difficult for pilots of manned aircraft to avoid a collision. To reduce the risk of collision, many conventional UASs are operated in "sterilized" airspace which has been previously cleared of all manned air traffic by air traffic controllers.

SUMMARY

First implementations of unmanned aerial system (UAS) position reporting systems may include an air traffic control reporting system (ATC-RS) coupled with a ground control station (GCS) of an unmanned aerial system where the ATC-RS includes an automatic dependent surveillance broadcast (ADS-B) and a traffic information services broadcast (TIS-B) transceiver and one or more telecommunication modems. The ATC-RS may be adapted to receive position data of the UAS in an airspace from the GCS and communicate the position of the UAS in the airspace to a civilian air traffic control center (ATC) or to a military command and control (C2) communication center through an ADS-B signal or through a TIS-B signal through the ADS-B and TIS-B transceiver. The ATC-RS may also be adapted to communicate with a civilian ATC or with a military C2 communication center through voice and data using the one or more telecommunication modems. The ATC-RS may be adapted to display the position of the UAS in the airspace on one or more display screens coupled with the ATC-RS.

First implementations of UAS position reporting systems may include one, all, or any of the following:

The ATC-RS may be further adapted to communicate the position of the UAS in a Standardization Agreement (STANAG) 4586 signal; a Cursor on Target (CoT) formatted signal; an ADS-B signal or TIS-B signal; a Standard Terminal Arrival Routes (STARS) signal; or an All Purpose Structured Eurocontrol Surveillance Information Exchange (ASTERIX) signal.

The ATC-RS may further include a UAS position data collector included in the GCS of the UAS and adapted to receive position data for the UAS in the airspace from the GCS and a communications input/output (I/O) circuit adapted to receive position data of the UAS in the airspace through a universal serial bus (USB) port connection with the GCS and to route data and voice information within the ATC-RS, where the communications I/O circuit is coupled with the ADS-B and TIS-B transceiver and the one or more telecommunication modems. The ATC-RS may also include an air traffic control (ATC) communication formatting module coupled with the communications I/O circuit and adapted to receive the position data from the UAS position data collector and to produce a civilian position data stream by formatting the position data to correspond with a civilian ATC data format. A command and control (C2) communication formatting module may be included and coupled with the communications I/O circuit. The C2 communication formatting module may be adapted to receive the position data from the UAS position data collector and to produce a military position data stream by formatting the position data to correspond with a military C2 communication center data format. A voice link module may also be included and may be coupled with the communications I/O circuit and may be adapted to receive voice information from a microphone and to convert the voice information to a voice data signal.

The communications input/output (I/O) circuit may further include a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

The one or more telecommunication modems may be one or more satellite modems.

Second implementations of unmanned aerial system reporting systems may include an unmanned aerial system (UAS) ground control station (GCS) adapted to receive or generate data identifying the position of a UAS in an airspace and to allow an operator of the UAS to operate the UAS and an air traffic control reporting system (ATC-RS) coupled with the GCS and adapted to communicate the position of the UAS in the airspace to an air traffic control center (ATC) or to a military command and control (C2) communication center. The ATC-RS may include an automatic dependent surveillance broadcast (ADS-B) and traffic information services broadcast (TIS-B) transceiver adapted to transmit the position of the UAS in the airspace to the ATC as an ADS-B signal or a TIS-B signal. The ATC-RS may also include one or more telecommunication modems adapted to allow an operator of the UAS to communicate by voice with the ATC and one or more display screens coupled with the ATC-RS adapted to display the position of the UAS in the airspace.

Second implementations of a UAS position reporting system may include one, all, or any of the following:

The ATC-RS may further include a UAS position data collector included in the GCS of the UAS and adapted to receive position data for the UAS in the airspace from the GCS. A communications input/output (I/O) circuit may be included and may be adapted to receive position data of the UAS in the airspace through a universal serial bus (USB) port connection with the GCS and the route data and voice information within the ATC-RS and may be coupled with the ADS-B and TIS-B transceiver and the one or more telecommunication modems. An air traffic control (ATC) communication formatting module may be included and may be coupled with the communications I/O circuit and adapted to receive the position data from the UAS position data collector and to produce a civilian position data stream by formatting the position data to correspond with a civilian ATC data format. A command and control (C2) communication formatting module may be included and may be coupled with the communications I/O circuit and may be adapted to receive the position data from the UAS position data collector and to produce a military position data stream by formatting the position data to correspond with a military C2 communication center data format. A voice link module may also be included that is coupled with the communications I/O circuit and adapted to receive voice information from a microphone and to convert the voice information to a voice data signal.

The communications I/O circuit may further include a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

The ATC-RS may be further adapted to communicate the position of the UAS in a Standardization Agreement (STANAG) 4586; a Cursor on Target (CoT) formatted signal; an ADS-B or TIS-B signal; a Standard Terminal Arrival Routes (STARS) signal, or an All Purpose Structured Eurocontrol Surveillance Information Exchange (ASTERIX) formatted signal.

The one or more telecommunication modems may be one or more satellite modems.

Implementations of an air traffic control reporting system (ATC-RS) may include an unmanned aerial system (UAS) position data collector adapted to receive position data for the UAS in an airspace from a GCS and a communications input/output (I/O) circuit adapted to receive position data of the UAS in the airspace through a universal serial bus (USB) port connection with the GCS and to route data and voice information within the ATC-RS. An air traffic control (ATC) communication formatting module may be included and may be coupled with the communications I/O circuit and adapted to receive the position data from the UAS position data collector and to produce a civilian position data stream by formatting the position data to correspond with a civilian ATC data format. A command and control (C2) communication formatting module may be included and may be coupled with the communications I/O circuit and may be adapted to receive the position data from the UAS position data collector and to produce a military position data stream by formatting the position data to correspond with a military C2 communication center data format. A voice link module may be included and may be coupled with the communications I/O circuit and may be adapted to receive voice information from a microphone and to convert the voice information to a voice data signal. One or more satellite modems may be coupled with the communications I/O circuit and may be adapted to transmit the voice data signal through a voice communication network and to transmit one or more data signals to a civilian ATC or to a military C2 communication center. An automatic dependent surveillance broadcast (ADS-B) and traffic information services broadcast (TIS-B) transceiver may be included and may be coupled with the communications I/O circuit and may be adapted to receive the civilian position data stream and the military position data stream and to transmit an ADS-B signal or a TIS-B signal corresponding with the civilian position data stream or the military position data stream.

Implementations of an ATC-RS may include one, all, or any of the following:

The military C2 communication center data format may be in a Standardization Agreement (STANAG) 4586; Cursor on Target (CoT); Standard Terminal Arrival Routes (STARS); or an All Purpose Structured Eurocontrol Surveillance Information Exchange (ASTERIX) format.

The communications I/O circuit may further include a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended unmanned aerial system (UAS) position reporting system and/or assembly procedures for a UAS position reporting system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such UAS position reporting systems and implementing components, consistent with the intended operation.

Figure 1:
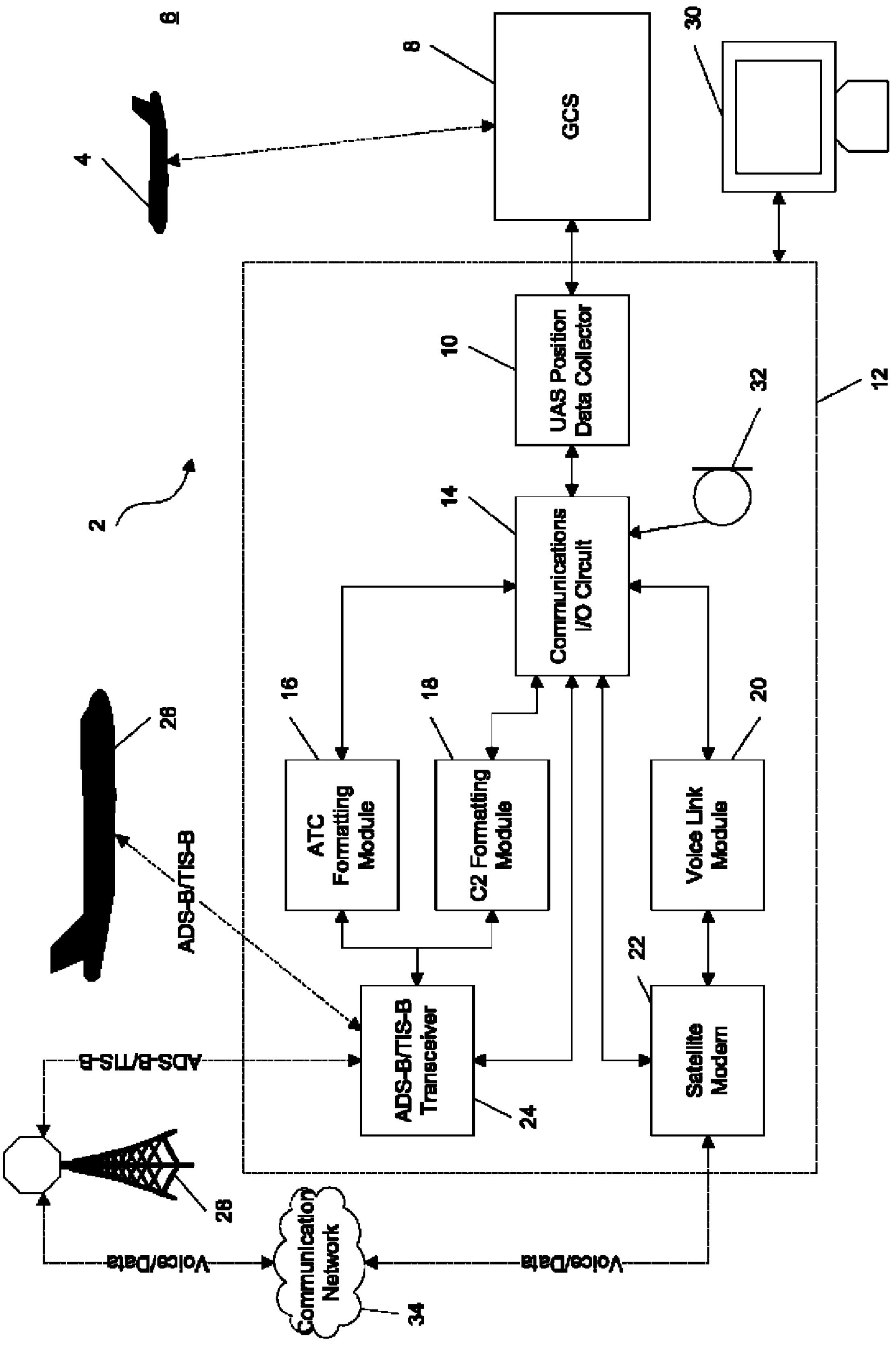
FIG. 1 is a flow chart of an implementation of an unmanned aerial system (UAS) position reporting system.

Referring to FIG. 1, a flow chart of an implementation of a UAS position reporting system 2 is illustrated. As illustrated, a UAS 4 may be airborne in a particular airspace 6 and being guided in flight by an operator through a ground control station (GCS) 8, which is coupled to UAS position data collector 10. In particular implementations, the UAS position data collector 10 may be a separate unit from the GCS 8; in other implementations, the UAS position data collector 10 may be incorporated into or exist in computer readable form on computer readable media and be operated by the GCS as a software program. The UAS position data collector 10 gathers position data that the GCS 8 is receiving from the UAS 4 or generating while the UAS 4 moves within the airspace 6. The UAS position data collector 10 then acts as a source of the position data for the rest of the UAS position reporting system 2.

As illustrated, the UAS position data collector 10 is included in an air traffic control reporting system (ATC-RS) 12. In particular implementations of UAS position reporting systems 2, the UAS position data collector 10 may be physically included in the ATC-RS 12; in other implementations, the UAS position data collector 10 may be physically separated from the ATC-RS 12.

As illustrated, the ATC-RS 12 also includes a communications input/output (I/O) circuit 14 coupled with an air traffic control (ATC) formatting module 16, a command and control (C2) formatting module 18, a voice link module 20, one or more telecommunication modems 22, an automatic dependent surveillance broadcast (ADS-B) and a traffic information services broadcast (TIS-B) transceiver 24, and a microphone 32. The communications I/O circuit 14 may serve in particular implementations to route signals and or power between all of the various modules and components; in other implementations, it may route signals between only some of the modules and an additional communications router module may be utilized for routing.

The communications I/O circuit 14 receives position data from the UAS position data collector 10 and routes it to the ATC formatting module 16 and the C2 formatting module 18. Whether the ATC formatting module 16 or the C2 formatting module 18, or both, are utilized during operation of the UAS position reporting system 2 depends upon whether the system will interface with a civilian air traffic control or military air traffic control system or both. If the system will operate in a civilian system, the ATC formatting module 16 formats the position data into a civilian data stream in a civilian data format. Examples of civilian data formats include ADS-B, TIS-B, Standard Terminal Arrival Routes (STARS), and All Purpose Structured Eurocontrol Surveillance Information Exchange (ASTERIX). If the UAS position reporting system 2 is being utilized in a military environment, the C2 formatting module 18 will format the position data into a military data stream in a military data format. Examples of military data formats include, by non-limiting example, Standardization Agreement (STANAG) 4586, Cursor on Target (CoT), and any other military air traffic control data format. Various forms of operating mode selection may be included in implementations of UAS position reporting systems 2 to permit operation in civilian, military, or in both civilian and military mode. In all data formats and in all system implementations disclosed in this document, any of a wide variety of radio transceiver types may be utilized. For example, in military applications, specialized radio transceiver types other than ADS-B and TIS-B transceivers may be utilized; in civilian applications, certain format types may also require the use of a different radio type than an ADS-B and TIS-B transceiver. The use of an ADS-B and TIS-B transceivers in implementations in this document is for the exemplary purposes of this disclosure.

The formatted data streams then pass to the ADS-B and TIS-B transceiver 24 for broadcasting as either an ADS-B signal or a TIS-B signal. In particular implementations, the TIS-B signal may be created by flipping a single bit in an ADS-B signal to indicate that the signal is coming from the ground. Relevant teachings regarding the nature and use of ADS-B and TIS-B transceivers and radios may be found in the provisional patent application to Limbaugh, et al., entitled "Unmanned Aerial System Position Reporting Systems and Related Methods," filed Feb. 15, 2008, the disclosure of which was previously incorporated herein by reference.

Because the ADS-B radio system has been designated by the Federal Aviation Administration (FAA) as a component of the next generation air traffic control system, present and future aircraft will contain an ADS-B device capable of receiving signals from the ADS-B and TIS-B transceiver 24. Because of this, and as illustrated in FIG. 1, the UAS position reporting system 2 has the ability to directly inform such aircraft 26 of the position of the UAS 4. In particular implementations, as illustrated in FIG. 1, the ADS-B and TIS-B transceiver 24 has the ability to transmit ADS-B/TIS-B signals to an air traffic control center (ATC) or C2 control center 28, thus permitting air traffic control personnel at the center to be able to view the position of the UAS 4. Because the position of the UAS 4 is now known by neighboring aircraft 26 and may also be visible to personnel at the ATC or C2 control center 28, the risk of collision with the UAS 4 may be reduced. In addition, because the ADS-B and TIS-B transceiver 24 has the ability to receive ADS-B and TIS-B signals, an operator of the UAS 4 may also be able to view the position of neighboring aircraft 26 in relation to the position of the UAS 4 itself on one or more displays 30 coupled to the ATC-RS 12.

While the position of the UAS 4 may be made visible to personnel at the ATC 28 itself through the ATC-RS 12, because the personnel at the ATC 28 cannot maintain direct voice contact with the operator of the UAS 4, flight regulations may still not permit the UAS 4 to be flown in the vicinity of neighboring aircraft 26. In particular implementations of UAS position reporting systems 2, a voice link module 20 may be included that receives voice information from a microphone 32 coupled with the communications I/O circuit 14. The voice link module 20 formats the voice information into a voice data signal that is then broadcast using one or more telecommunication modems 22, which may be satellite modems in particular implementations. Because the one or more telecommunication modems 22 can be connected to the ATC 28 through a communication network 34, personnel at the ATC 28 can maintain voice contact with the operator of the UAS 4 while it is in flight and issue commands and request status updates. Examples of communications networks 34 that could be utilized for voice communication include the public switched telephone network (PSTN), the internet, a wide area network (WAN), a satellite communication network, or any other network capable of transmitting voice and data information. In particular implementations, additional or duplicate position data for the UAS 4 may be transmitted using the one or more telecommunication modems 22 to the ATC 28 in any desired data format, thereby providing both voice and data transmission capability as well as permitting the ACT 28 to utilize the position data for a wide variety of purposes, including displaying the position of the UAS 4.

Any of a wide variety of particular component types may be used to form particular implementations of UAS position reporting systems 2. For the exemplary purposes of this disclosure, the ATC formatting module 16 and C2 formatting module 18 may be implemented as computer readable instructions on computer readable media operable by a processor or an embedded controller. The voice link module 20 may be a transducer and the one or more telecommunication modems 22 may be an Iridium® 9522A satellite modem. The ADS-B/TIS-B transceiver may be a Universal Access Transceiver Beacon Radio (UBR) designed by MITRE Corporation of McLean, Va., USA.

Figure 2:
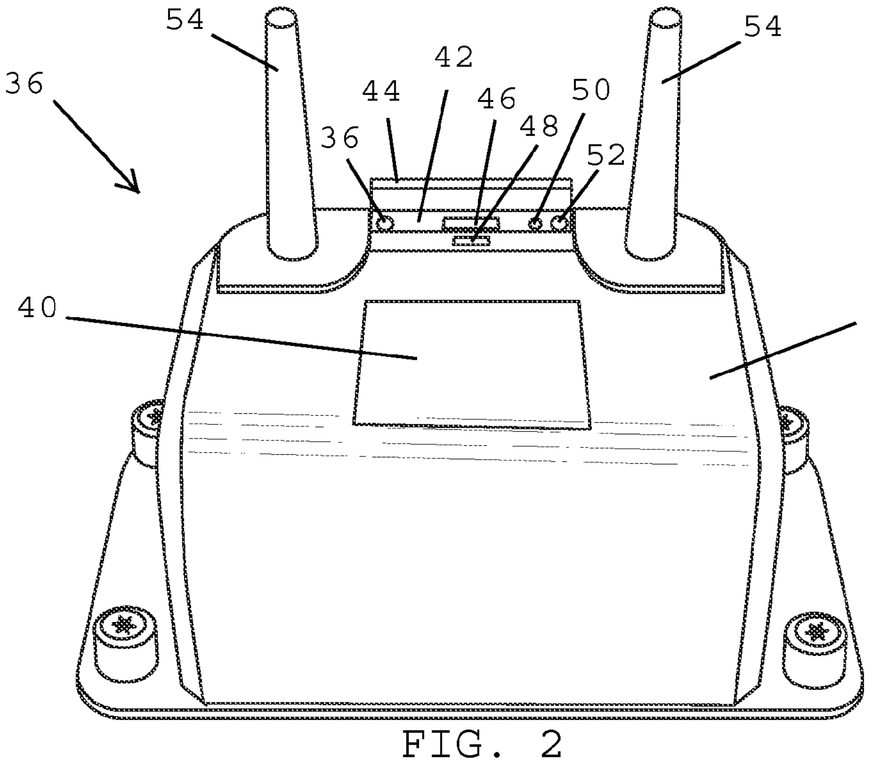
FIG. 2 is a front perspective view of an implementation of an air traffic control reporting system (ATC-RS)

Referring to FIG. 2, a particular implementation of an ATC-RS 36 is illustrated. As illustrated, the ATC-RS 36 may include a case 38 that houses and protects the various modules and components. The case 38 may be constructed to comply with a wide variety of military or other reliability standard specifications, such as, by non-limiting example, shock, vibration, impact, humidity, temperature, water resistance, or any other reliability or performance characteristic. The case 38 may include an opening for the one or more satellite modem antennas 40 and an interface opening 42 capable of being closed with lid 44 that contains various controls and interface types. As illustrated in FIG. 2, a universal serial bus (USB) port 46 may be included that is used to connect with a GCS unit. In particular implementations, the design of the communication I/O circuit allows connection of the ATC-RS 36 to the GCS using only one USB cable at the USB port 46. A main power switch 48, various indicator lights 50, and a microphone/headset interface 52 may also be included. As illustrated, one or more ADS-B and TIS-B transceiver antennas 54 may extend from the case 38. A wide variety of other components, such as external power supplies, internal power supplies, batteries, displays, or other components may be included within or external to the case as part of the ATC-RS 36.

Figure 3:
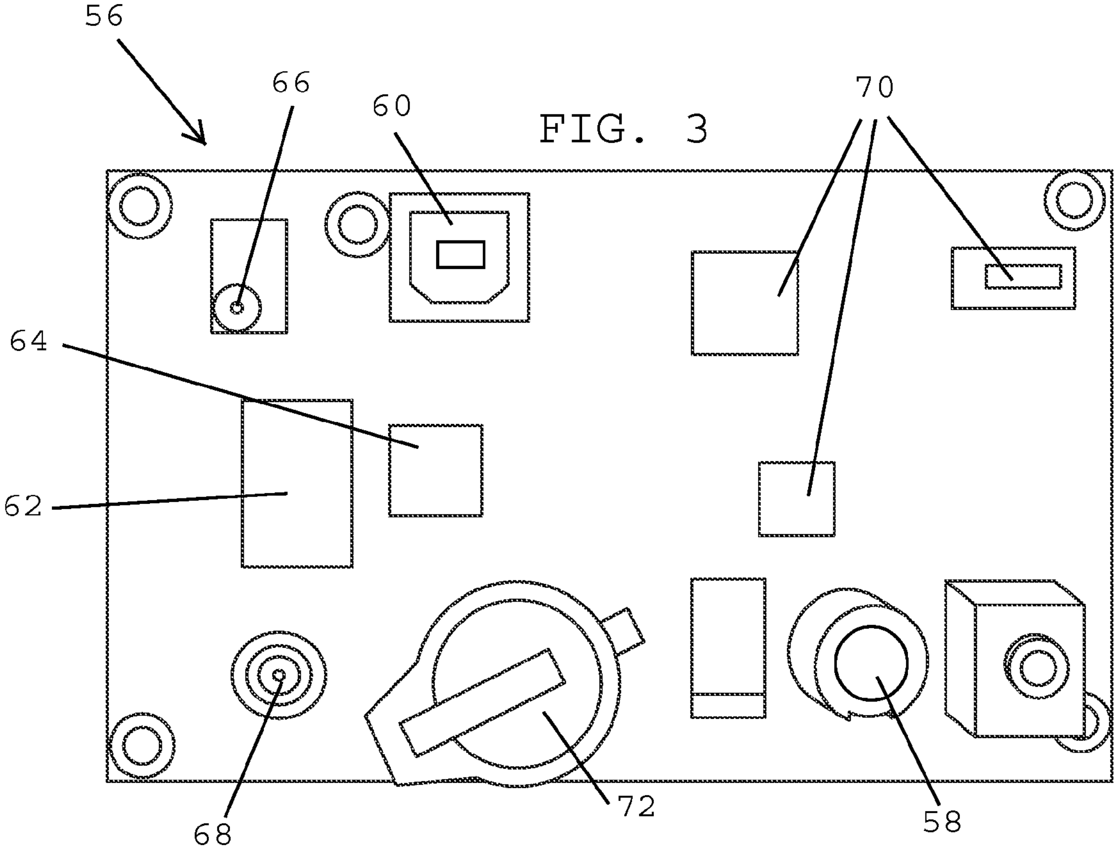
FIG. 3 is a top block view of an implementation of a communications input/output (I/O) circuit.

Referring to FIG. 3, an implementation of a communication I/O circuit 56 is illustrated. As illustrated, the circuit 56 may include a Recommended Standard (RS) 232 and RS-422 to Universal Serial Bus (USB) converter, accessible via RS-232/RS-422 connector 58 on the board. In particular implementations, an RS-485 serial connector interface or RS-432 interface may also be included or may be used in place of either the RS-232 or RS-422 portions. A USB port 60 and/or hub may be included as part of the circuit 56. A flash drive 62 may also be included as part of the circuit 56 and may be adapted in particular implementations to store flight position and/or other performance or operating data from the UAS during flight to act as a UAS "black box," particularly during UAS test flight situations. A flash memory controller 64 may be included as part of the circuit 56 along with power input 66, which is adapted to receive power from an external power supply. A Global Positioning System (GPS) receiver and antenna may be included as part of the circuit 56 and may be connected via a Bayonet Neill Concelman (BNC) connector or a Subminiature Version A (SMA) connector 68. As illustrated in FIG. 3, various other components 70 necessary to allow the circuit to route signals and power through the circuit and one or more internal batteries 72 for any processor clocks may also be included in particular implementations.

Figure 4:
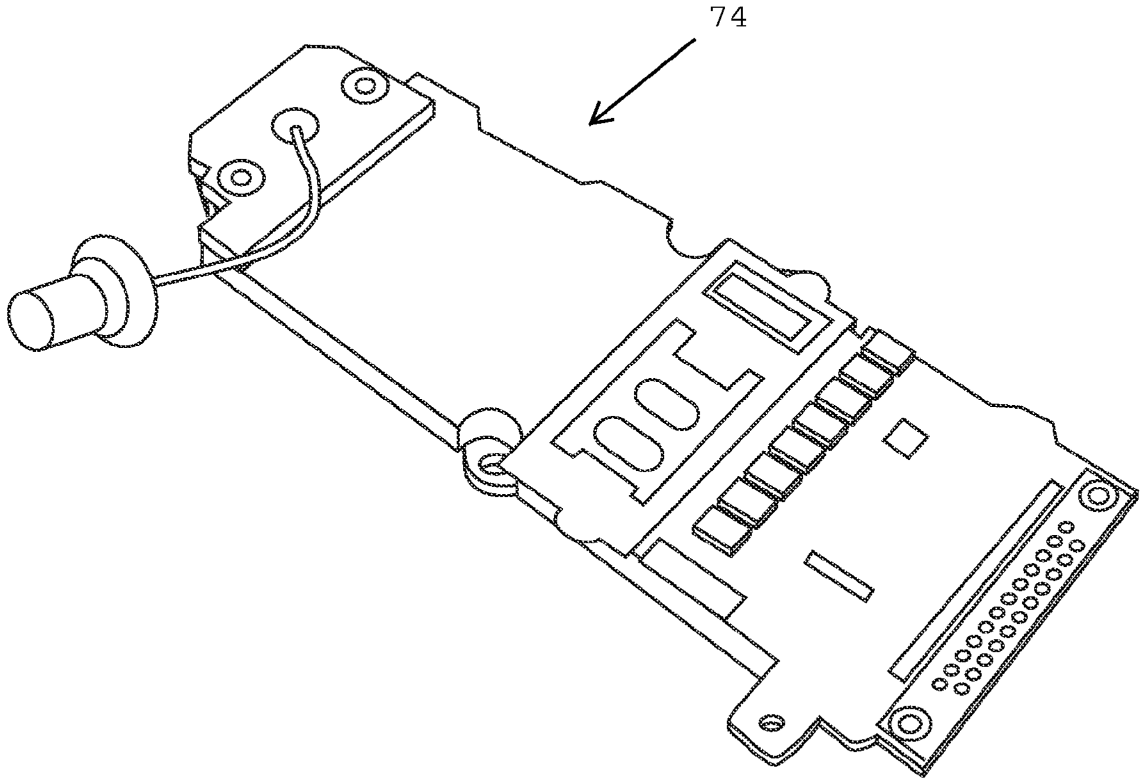
FIG. 4 is a front perspective view of an implementation of a satellite modem.

Referring to FIG. 4, an implementation of a satellite modem 74 is illustrated. The particular implementation illustrated in FIG. 4 is a partly disassembled Iridium® 9255A satellite modem. Because the Iridium® satellite network does not support voice and data communication on a single channel, implementations of UAS position reporting systems that utilize Iridium® branded modems require two satellite modems, one for voice, and one for data. However, any of a wide variety of other satellite modems, telecommunication modems, cellular networks, wireless devices, the internet, or other network devices could also be utilized for voice and/or data transmission in particular implementations.

The foregoing description has described implementations of ATC-RS units 12, 36 that are adapted to communicate with a UAS and with an ATC or C2 control center. The principles disclosed in this document, however, may be applied to any remotely, semi-autonomously, or autonomously guided land, surface water, submersible, or space vehicle where direct position communication with neighboring manned vehicles and/or an overseeing control center is desired.

In places where the description above refers to particular implementations of UAS position reporting systems, it should be readily apparent that a number of modifications may be made without departing from the spirit thereof and that these implementations may be applied to other UAS position reporting systems.

The invention claimed is:

1. An unmanned aerial system position reporting system comprising:

an air traffic control reporting system (ATC-RS) coupled with a ground control station (GCS) and located on the ground, the GCS in operational communication with an unmanned aerial system (UAS) for guidance during flight, the ATC-RS comprising an automatic dependent surveillance broadcast (ADS-B) and a traffic information services broadcast (TIS-B) transceiver and one or more telecommunication modems, the ATC-RS adapted to:

gather from the GCS position data of the UAS in an airspace, wherein the GCS receives the position data from the UAS or generates the position data while the UAS moves in the airspace;

communicate the position of the UAS in the airspace to a civilian air traffic control center (ATC) and to a military command and control (C2) communication center through an ADS-B signal or through a TIS-B signal through the ADS-B and TIS-B transceiver;

communicate with a civilian ATC and with a military C2 communication center through voice and data using the one or more telecommunication modems; and display the position of the UAS in the airspace on one or more display screens coupled with the ATC-RS.

2. The system of claim 1, wherein the ATC-RS is further adapted to communicate the position of the UAS in a Standardization Agreement (STANAG) 4586 signal; a Cursor on Target (CoT) formatted signal; an ADS-B signal or TIS-B signal; a Standard Terminal Arrival Routes (STARS) signal, or an All Purpose Structured Eurocontrol Surveillance Information Exchange (ASTERIX) signal.

3. The system of claim 1, wherein the ATC-RS further comprises:

a UAS position data collector comprised in the GCS of the UAS and adapted to receive position data for the UAS in the airspace from the GCS;

a communications input/output (I/O) circuit adapted to receive position data of the UAS in the airspace through a universal serial bus (USB) port connection with the GCS and to route data and voice information within the ATC-RS, the communications I/O circuit coupled with the ADS-B and TIS-B transceiver and the one or more telecommunication modems;

an air traffic control (ATC) communication formatting module coupled with the communications I/O circuit, the ATC communication formatting module adapted to receive the position data from the UAS position data collector and to produce a civilian position data stream by formatting the position data to correspond with a civilian ATC data format;

a command and control (C2) communication formatting module coupled with the communications I/O circuit, the C2 communication formatting module adapted to receive the position data from the UAS position data collector and to produce a military position data stream by formatting the position data to correspond with a military C2 communication center data format; and a voice link module coupled with the communications I/O circuit and adapted to receive voice information from a microphone and to convert the voice information to a voice data signal.

4. The system of claim 3, wherein the communications input/output (I/O) circuit further comprises a USB hub, a Wide Area Augmentation System (WAAS) Global Positioning System (GPS) receiver, a Recommended Standard-232

(RS-232) and RS-422 to USB interface, one or more power converters, an embedded flash drive, and an external power supply.

5. The system of claim 1, wherein the one or more telecommunication modems are one or more satellite modems.

6. An unmanned aerial system position reporting system comprising:

an unmanned aerial system (UAS) ground control station (GCS) adapted to receive or generate data identifying the position of a UAS in an airspace and to allow an operator of the UAS to operate the UAS;

an air traffic control reporting system (ATC-RS) coupled with the GCS and located on the ground, the ATC-RS adapted to gather from the GCS the data identifying the position of the UAS and then transmit the position of the UAS in the airspace to an air traffic control center (ATC) and to a military command and control (C2) communication center, the ATC-RS comprising:

an automatic dependent surveillance broadcast (ADS-B) and traffic information services broadcast (TIS-B) transceiver adapted to transmit the position of the UAS in the airspace to the ATC as an ADS-B signal or a TIS-B signal;

one or more telecommunication modems adapted to allow an operator of the UAS to communicate by voice with the ATC; and one or more display screens coupled with the ATC-RS, the one or more display screens adapted to display the position of the UAS in the airspace.

7. The system of claim 6, wherein the ATC-RS further comprises:

a UAS position data collector comprised in the GCS of the UAS and adapted to receive position data for the UAS in the airspace from the GCS;

a communications input/output (I/O) circuit adapted to receive position data of the UAS in the airspace through a universal serial bus (USB) port connection with the GCS and to route data and voice information within the ATC-RS, the communications I/O circuit coupled with the ADS-B and TIS-B transceiver and the one or more telecommunication modems;

an air traffic control (ATC) communication formatting module coupled with the communications I/O circuit, the ATC communication formatting module adapted to receive the position data from the UAS position data collector and to produce a civilian position data stream by formatting the position data to correspond with a civilian ATC data format;

a command and control (C2) communication formatting module coupled with the communications I/O circuit, the C2 communication formatting module adapted to receive the position data from the UAS position data collector and to produce a military position data stream by formatting the position data to correspond with a military C2 communication center data format; and a voice link module coupled with the communications I/O circuit and adapted to receive voice information from a microphone and to convert the voice information to a voice data signal.

8. The system of claim 7, wherein the communications I/O circuit further comprises a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

9. The system of claim 6, wherein the ATC-RS is further adapted to communicate the position of the VAS in a Standardization Agreement (STANAG) 4586 formatted signal; a Cursor on Target (CoT) formatted signal; an ADS-B signal or TIS-B signal; a Standard Terminal Arrival Routes (STARS) formatted signal, or an All Purpose Structured Eurocontrol Surveillance Information Exchange (ASTERIX) formatted signal.

10. The system of claim 6, wherein the one or more telecommunication modems are one or more satellite modems.

11. An air traffic control reporting system (ATC-RS) on the ground, the ATC-RS comprising:

an unmanned aerial system (UAS) position data collector, the UAS position data collector adapted to gather from a ground control station (GCS) position data for the UAS in an airspace, the GCS in operational communication with the UAS for guidance during flight;

a communications input/output (I/O) circuit adapted to receive position data from the GCS of the UAS in the airspace through a universal serial bus (USB) port connection with the GCS and to route data and voice information within the ATC-RS;

an air traffic control (ATC) communication formatting module coupled with the communications I/O circuit, the ATC communication formatting module adapted to receive the position data from the UAS position data collector and to produce a civilian position data stream by formatting the position data to correspond with a civilian ATC data format;

a command and control (C2) communication formatting module coupled with the communications I/O circuit, the C2 communication formatting module adapted to receive the position data from the UAS position data collector and to produce a military position data stream by formatting the position data to correspond with a military C2 communication center data format;

a voice link module coupled with the communications I/O circuit and adapted to receive voice information from a microphone and to convert the voice information to a voice data signal;

one or more satellite modems coupled with the communications I/O circuit, the one or more satellite modems adapted to transmit the voice data signal through a voice communication network and to transmit one or more data signals to a civilian ATC and to a military C2 communication center; and an automatic dependent surveillance broadcast (ADS-B) and traffic information services broadcast (TIS-B) transceiver coupled with the communications I/O circuit, the ADS-B transceiver adapted to receive the civilian position data stream and the military position data stream and to transmit an ADS-B signal or a TIS-B signal corresponding with the civilian position data stream and the military position data stream.

12. The system of claim 11, wherein the military C2 communication center data format is in a Standardization Agreement (STANAG) 4586, Cursor on Target (CoT), Standard Terminal Arrival Routes (STARS) or an All Purpose Structured Eurocontrol Surveillance Information Exchange (ASTERIX) format.

13. The system of claim 11, wherein the communications I/O circuit further comprises a USB hub, a Wide Area Augmentation System (WAAS) Global Positioning System (GPS) receiver, a Recommended Standard-232 (RS-232) and RS-422 to USB interface, one or more power converters, an embedded flash drive, and an external power supply.

* * * * *